United States Patent [19]

Ortner et al.

[11] Patent Number: 5,152,318
[45] Date of Patent: Oct. 6, 1992

[54] SCREW-IN THROTTLE VALVE AND PRESSURE GAUGE ASSEMBLY

[75] Inventors: Robert Ortner, Alzenau 4; Erich Pietsch, Offenbach/Main, both of Fed. Rep. of Germany

[73] Assignee: MAN Roland Druckmaschinen AG, Fed. Rep. of Germany

[21] Appl. No.: 641,488

[22] Filed: Jan. 15, 1991

[30] Foreign Application Priority Data

Jan. 17, 1990 [DE] Fed. Rep. of Germany .... 4001170.5

[51] Int. Cl.⁵ .............................................. F16K 31/50
[52] U.S. Cl. ..................................... 137/557; 251/264
[58] Field of Search ........................... 137/557; 73/707; 251/264

[56] References Cited

U.S. PATENT DOCUMENTS

| 1,484,740 | 2/1924 | Rubino | 251/264 |
| 3,259,144 | 7/1966 | Taplin | 137/557 X |
| 3,272,230 | 9/1966 | Bolling | 137/557 |
| 3,402,608 | 9/1968 | Nishigori | 73/707 |
| 4,092,865 | 6/1978 | Strybel | |
| 4,355,658 | 10/1982 | Snyder | 137/557 |

FOREIGN PATENT DOCUMENTS

| 6901834 | 1/1969 | Fed. Rep. of Germany . | |
| 1964127 | 6/1971 | Fed. Rep. of Germany | 137/557 |
| 1921509 | 2/1974 | Fed. Rep. of Germany . | |
| 7815395 | 10/1978 | Fed. Rep. of Germany . | |
| 16916 | 7/1981 | Fed. Rep. of Germany . | |
| 4001170.4 | 9/1990 | Fed. Rep. of Germany . | |

Primary Examiner—Alan Cohan
Attorney, Agent, or Firm—Leydig, Voit & Mayer

[57] ABSTRACT

A screw-in throttle valve and pressure gauge assembly including a valve member and a selectively rotatable screw-in member operatively associated with the valve member for permitting selected positioning of the valve member with respect to a valve seat. The screw-in valve member supports a pressure gauge at a location outside the valve body and the valve member is formed with a capillary bore communicating between a first flow duct downstream of the valve seat and the pressure gauge so that when the screw-in member and valve member are selectively positionable for varying the gap between the valve seat and valve member the valve gauge is simultaneously moveable with the valve member and screw-in member for directly measuring the pressure at the first flow duct without alteration of the pressure gauge.

6 Claims, 1 Drawing Sheet

SCREW-IN THROTTLE VALVE AND PRESSURE GAUGE ASSEMBLY

FIELD OF THE INVENTION

The present invention relates generally to screw-in valve assemblies, and more particularly, to throttle valve assemblies of such type for controlling air flow consumption in the sheet delivery plants of printing presses having pressure or suction operated means.

BACKGROUND OF THE INVENTION

A wide variety of screw-in type valve assembly constructions are known which, for example, have a valve body formed with a throttle seat and a valve member that is screwed into a tapped hole in the valve body and formed with a throttle cone for controlling air flow from one air duct to another depending upon the gap between the throttle cone and valve seat. The air flow through the valve assembly is dependent upon the difference between the pressures on either side of the throttle gap defined by the cone and seat, and it is conventional to measure the pressure by means of pressure gauges connected by special lines that communicate with the gap. Monitoring the pressure in such way facilitates adjustment of the valve in accordance with the operating parameters at the sheet delivery station, such as paper quality or speed of the press. For this purpose, conventional manometers have been provided, such as spring diaphragms, or spring tubes or capsule element measuring devices. Such devices are adapted for direct contact with the medium, i.e., air, to be measured, and it is necessary the air pressure be propagated to the measuring spring or the like.

OBJECT AND SUMMARY OF THE INVENTION

It is an object of the present invention to provide a screw-in throttle valve assembly in which the pressure adjustment and pressure indicating means are in such spacial association as to permit improved measurement and monitoring of the operating pressure.

Other objects and advantages of the invention will become apparent upon reading the following detailed description and upon reference to the drawings, in which:

Figure 1:
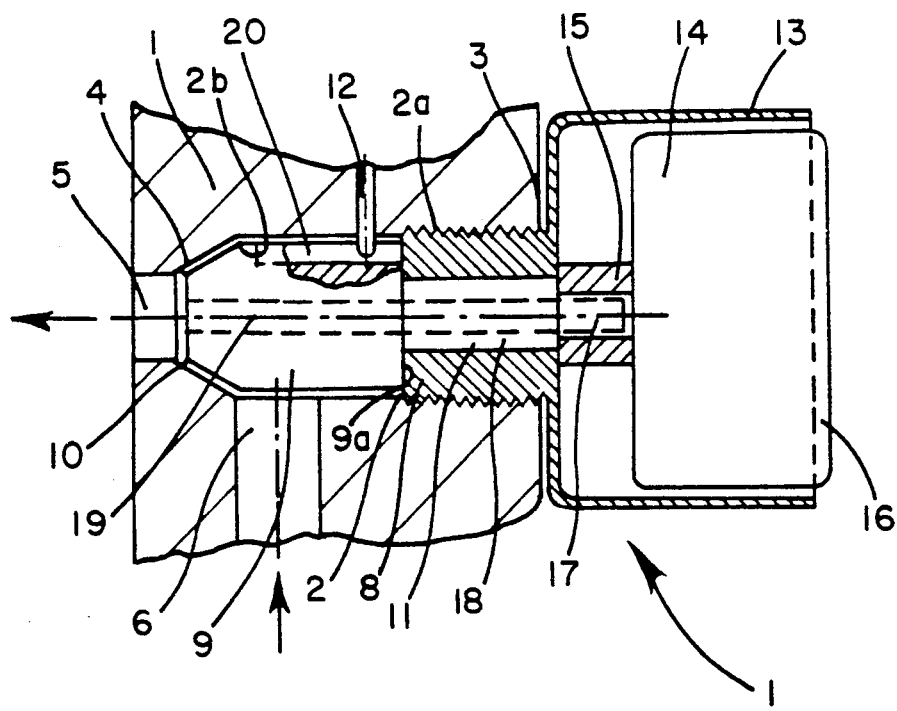
FIG. 1 is longitudinal section of a screw-in type throttle valve assembly in accordance with the present invention.
Figure 2:
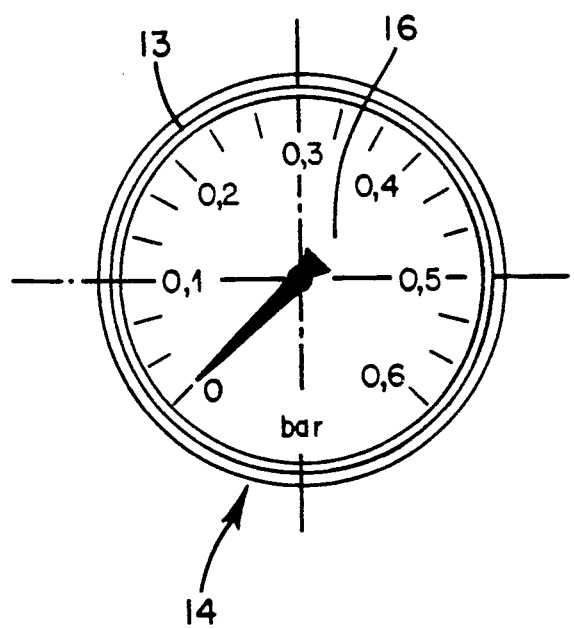
FIG. 2 is an end view of the illustrated screw-in throttle valve assembly and particularly depicting the face of the pressure gauge.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DESCRIPTION OF THE PREFERRED EMBODIMENT

Referring now more particularly to the drawings, there is shown an illustrative throttle valve assembly embodying the invention comprising a valve body 1 having a bore 2. The bore 2 includes a threaded portion 2a opening adjacent an entry side 3 of the body, an extension portion 2b inwardly in said body, to the left of the threaded portion as viewed in FIG. 1, which terminates in a tapered or conical throttle valve seat 4, which in turn communicates with a first flow duct 5 communicating with an opposite side of the valve body 1. The valve body has a second flow duct 6 separated by the valve seat 4 from the first flow duct 5 and extending laterally into the bore 2. It will be understood that the valve body could have other lateral flow ducts communicating with the bore 2 on the upstream side of the valve seat 4.

For selectively controlling the flow of air between the first and second ducts 5, 8, in this case being in the direction of the arrows in FIG. 1, an axially adjustable valve member or lid 9 is provided in the bore 2. The adjustably movable valve member 9 includes a conically tapered end or throttle cone 10 that is positionable with respect to the conical seat 4 for defining a predetermined air flow gap therebetween.

In order to selectively axially advance and retract the valve member 9 in the bore 2 to vary the air gap between the throttle cone 10 and conical seat 4, a screw-in member 8 operatively associated with the valve member 9 is adapted for threaded engagement with the threaded portion 2a of the bore 2. The screw-in member 8 has a dish body or housing 13 disposed outwardly of the valve body 1 within which is mounted the cylindrical casing of a conventional pressure gauge 14, such as a spring pressure gauge, having an outwardly facing dial 16 for easy observation and reading.

In accordance with the invention, the movable valve member is formed with a capillary bore communicating between the first flow duct and the pressure gauge, and the valve member, screw-in member, and pressure gauge are simultaneously adjustable within the valve body bore for facilitating direct accurate measurement of the pressure at the first flow duct at all adjusted positions of the valve member. To this end, the illustrated valve member 9 has a first reduced diameter, axial extension or pin 18 on a side opposite the throttle cone 10 upon which the screw-in member is mounted for relative rotation, the latter having an axial bore 11 positioned over the extension 18. For mounting the pressure gauge 14 onto the valve member 9, the valve member 9 has a further axial extension or pin 17 of smaller diameter than the first axial extension 18, and the back side of the pressure gauge 14 has a cylindrical sleeve-shaped coupling member 15 secured thereto which is adapted for pressed-in, pressure-tight engagement over the second extension or pin 17. The coupling member 15 has an outer diameter greater than the diameter of the first axial extension 18 of the valve member 9 for captively securing the valve member 9 to the screw-in member 8 between the coupling member 15 and a shoulder 9a defined by the valve member 9 and the first axial extension 18.

In order to guide axial movement of the valve member 9 relative to the valve body 1 upon rotation of the screw-in member 8, the valve member 9 has an axial groove 20 for receiving a projecting end of a lateral entry pin 12 secured in the valve body. Hence, rotation of the screw-in member 8, such as by gripping the housing 13, advances or retracts the screw-in member 8 without rotation relative to the bore 2 and valve seat 4, simultaneously moving the valve member 9 and the pressure gauge 14.

In carrying out the invention, for communicating pressure between the first flow duct 5 on one side of the valve body 1 and the pressure gauge 14 at the other side of the valve body 1, the valve member 9 has an axial capillary bore 19 which extends through the valve member 9, the first reduced diameter extension 18, and second reduced diameter extension 17. Hence, pressure at the first flow duct 5, which will be dependent upon the gap between the valve core 10 and valve seat 4 and the existing air flow, can be directly monitored by the gauge 14 at each axial setting of the valve member without alteration of the indication or zero position of the pressure gauge 14.

It will be appreciated that the invention is not limited to the particular throttle valve assembly illustrated, but can be utilized in various screw-in valve assemblies having a pressure gauge associated at one end for monitoring the pressure at an opposite end thereof.

What is claimed is:

1. A throttle valve assembly comprising a valve body having a bore with a tapped portion opening at an entry side thereof, said bore defining a conical valve seat which in turn communicates with a first flow duct remote from said entry side of the valve body, said body having a second flow duct communicating with said bore on an opposite side of said seat than said first flow duct, a valve member having a reduced diameter portion and a throttle cone at one end, a screw-in member having a sleeve shaped portion disposed over said reduced diameter portion of said valve member for relative rotational movement and being in threaded engagement with said tapped portion, means for captively retaining said valve member on said screw-in member such that upon rotation of said screw-in member said screw-in member and valve member axially move together in said bore for selectively positioning said valve member with respect to said valve seat for defining a predetermined flow gap between said throttle cone and valve seat, a pressure gauge mounted on said screw-in member and disposed at a location outside said valve body, and said valve member being formed with a capillary bore communicating between said first duct and said pressure gauge so that when the screw-in member and valve member are selectively positioned relative to said bore for varying the gap between said valve seat and throttle cone the pressure gauge is simultaneously movable with the valve member and the screw-in member for direct measurement of the pressure at said first duct without alteration of the pressure gauge.

2. The valve assembly of claim 1 including means for preventing rotational movement of said valve member while permitting axial positioning thereof in said bore.

3. The screw-in member of claim 2 in which said means for preventing rotational movement of said valve member includes a longitudinal groove in the outer perimeter of said valve member, and a transverse pin secured within said valve body and having an end protruding into said valve member groove.

4. The valve assembly of claim 1 in which said valve member includes a first reduced diameter pin portion upon which said screw-in member is mounted and which defines a first abutment, said valve member including a second pin portion of smaller diameter of said first pin portion, and said pressure gauge having a coupling member on a rear side thereof for pressure tight engagement with said second pin portion.

5. The valve assembly of claim 4 in which said coupling means is sleeve-shaped with an outer diameter greater than the diameter of said valve member first pin portion for captively securing the valve member to said screw-in member between the coupling member and said first abutment.

6. The valve assembly of claim 4 in which said capillary bore extends axially through said first and second pin portions.

* * * * *